United States Patent
Stoecker et al.

(10) Patent No.: US 10,082,660 B2
(45) Date of Patent: Sep. 25, 2018

(54) TRANSPARENT MICROSCOPE SLIDE HAVING A MARKING

(71) Applicant: EUROIMMUN MEDIZINISCHE LABORDIAGNOSTIKA AG, Luebeck (DE)

(72) Inventors: Winfried Stoecker, Gross Groenau (DE); Norbert Rottmann, Luebeck (DE); Norbert Koop, Schattin (DE)

(73) Assignee: EUROIMMUN MEDIZINISCHE LABORDIAGNOSTIKA AG, Luebeck (DE)

( * ) Notice: Subject to any disclaimer, the term of this patent is extended or adjusted under 35 U.S.C. 154(b) by 0 days.

(21) Appl. No.: 15/111,118

(22) PCT Filed: Oct. 27, 2014

(86) PCT No.: PCT/EP2014/002891
§ 371 (c)(1),
(2) Date: Jul. 12, 2016

(87) PCT Pub. No.: WO2015/106774
PCT Pub. Date: Jul. 23, 2015

(65) Prior Publication Data
US 2016/0334612 A1    Nov. 17, 2016

(30) Foreign Application Priority Data

Jan. 16, 2014 (DE) .................. 10 2014 000 360
Jan. 22, 2014 (EP) .................... 14152113

(51) Int. Cl.
*B01L 3/00* (2006.01)
*G02B 21/34* (2006.01)

(52) U.S. Cl.
CPC .............. *G02B 21/34* (2013.01); *B01L 3/508* (2013.01); *B01L 3/54* (2013.01); *B01L 3/545* (2013.01);
(Continued)

(58) Field of Classification Search
CPC . G02B 21/34; B01L 3/54; B01L 3/545; B01L 3/508; B01L 3/5088; B01L 2300/0822; B01L 2300/021
See application file for complete search history.

(56) References Cited

U.S. PATENT DOCUMENTS 4,415,405 A * 11/1983 Ruddle ................ G03F 7/0005
216/41
RE35,589 E * 8/1997 Fisch .................... G02B 21/34
356/246

(Continued)

FOREIGN PATENT DOCUMENTS

CN    103080807 A    5/2013
DE    101 37 864 A1    2/2003
(Continued)

OTHER PUBLICATIONS

Extended European Search Report dated Jun. 16, 2014 in Patent Application No. 14152113.8 (with unedited computer generated English translation).
(Continued)

*Primary Examiner* — Dennis White
(74) *Attorney, Agent, or Firm* — Grüneberg and Myers PLLC (57) ABSTRACT

The invention relates to a transparent object carrier, which has a marking impressed in the interior, to a diagnostic instrument, preferably a microscope, in combination with a transparent object carrier inserted for diagnostic analysis, and to a method, comprising the steps of providing a
(Continued)

transparent object carrier, impressing a marking, which is located in the interior of the carrier, supplying the transparent object carrier with a biological or chemical sample, and, optionally, dividing the transparent object carrier and thereby producing a plurality of smaller transparent object carriers that enclose material from the biological or chemical sample.

20 Claims, 4 Drawing Sheets (52) U.S. Cl.
CPC ....... *B01L 3/5088* (2013.01); *B01L 2300/021* (2013.01); *B01L 2300/0822* (2013.01)

(56) References Cited

U.S. PATENT DOCUMENTS

| | | |
|---|---|---|
| 6,596,966 B1 | 7/2003 | Kickelhain et al. |
| 2002/0167577 A1 | 11/2002 | Kiene et al. |
| 2003/0124583 A1 | 7/2003 | Staab |
| 2005/0208467 A1* | 9/2005 | Qiu ................. B01L 3/5085 435/4 |
| 2008/0056952 A1* | 3/2008 | Angros ............. B01L 3/545 422/400 |
| 2010/0163540 A1 | 7/2010 | Vogel et al. |
| 2013/0162804 A1 | 6/2013 | Morrin |

FOREIGN PATENT DOCUMENTS

| | | |
|---|---|---|
| DE | 10 2007 028 042 B3 | 8/2008 |
| EP | 1 051 365 B1 | 6/2002 |
| EP | 1 245 395 A2 | 10/2002 |
| EP | 1 277 055 A1 | 1/2003 |
| WO | 02/27380 A1 | 4/2002 |
| WO | 03/014738 A2 | 2/2003 |
| WO | WO 03/014738 A2 | 2/2003 |
| WO | 2012/025220 A1 | 3/2012 |

OTHER PUBLICATIONS

European Office Action dated Jan. 4, 2016 in Patent Application No. 14152113.8 (with unedited computer generated English translation).
International Search Report and Written Opinion dated Mar. 11, 2015 in PCT/EP2014/002891 (with unedited computer generated English translation).
International Preliminary Report on Patentability and Written Opinion dated Jul. 19, 2016 in PCT/ EP2014/002891 (with unedited computer generated English translation).
International Search Report dated Mar. 11, 2015, in PCT/EP2014/ 002891 Filed Oct. 27, 2014.
Koop, "Schreib' mal wieder! Neue Laser-Markierungsverfahren und spezielle Mikrobearbeitungen," Git Labor-Fachzeitschrift, vol. 57, Oct. 2013, XP055121027 (4 pages).
"Laser-Nanotechnologies in Glass—Katalog glassmicrostructures," boraident GmbH, 2013, XP055173106, URL: http://www.boraident. de/ index.php ?id=118&state=core&action=classfunc&file=katalog glassmicrostructures 2013.pdf (12 pages).
Combined Chinese Office Action and Search Report dated Jun. 16, 2017 in Chinese Patent Application No. 201480073130.6 (with English translation).

* cited by examiner

TRANSPARENT MICROSCOPE SLIDE HAVING A MARKING

The present invention relates to a transparent microscope slide comprising an internally impressed marking, to a diagnostic instrument, preferably microscope, in combination with a transparent microscope slide introduced for diagnostic analysis, and to a method comprising the steps of providing a transparent microscope slide, impressing a marking which is located inside the slide, supplying the transparent microscope slide with a biological or chemical sample and, optionally, dividing the transparent microscope slide to produce a multiplicity of smaller transparent microscope slides comprising material from the biological or chemical sample.

Laboratory diagnostic examinations are an indispensible foundation of modern medicine. There is now a multiplicity of routinely performable tests available, by means of which it is possible, in the absence of the patient, to obtain crucial information relating to the present symptoms, to the prognosis or to the success of a treatment from sample material of human or animal origin.

Responsibility to the patient dictates that maximum demands be placed on the reliability and meaningfulness of the results of such examinations. To this end, it is necessary to ensure a stringent identity safeguard, in which it is possible, from acquiring the sample material at the human or animal body up to making the diagnosis, to rule out under all circumstances a loss or even a mismatching of data to a patient other than the sample donor.

At the same time, it is necessary to optimize workflows and material consumption on the basis of economic considerations. In particular, there is the trend toward miniaturization: diagnostic and analytical reactions are no longer carried out on the milliliter scale, but on the microliter or even nanoliter scale. This saves reagents, space and allows a sample which has been acquired once and which may be thawed and refrozen multiple times to provide enough starting material for a large number of diagnostic examinations.

Not least, in the event too of an individual diagnostic test failing for technical reasons or because of errors by the member of staff entrusted with carrying it out, the patient is spared the repeated collection of a sample.

For the identity safeguard, a sample in a vessel or on a microscope slide is usually supplied with a marking which is assigned to a patient. If the sample is situated in commercially available vessels with a content of at least a few milliliters, for example blood collection tubes, said marking together with the most important patient data can be printed out on an adhesive film and stuck on the vessel.

When processing the sample on the microliter scale, the identity safeguard runs into much greater difficulties, especially when special or even custom-manufactured medical devices of a few millimeters in size, more particularly miniaturized microscope slides for samples such as biochips, are used. Large-area, adhesive labels, commercially available barcodes, magnetic strips or the like, as taught by the prior art in connection with biochips (EP 1 277 055), are then no longer possible for geometric reasons.

Conventional markings described in the prior art, such as engravings, imprints, labels and the like, as described in EP 1 245 395 for example, have further disadvantages. First, they use a considerable amount of space on the surface of the biochip and thus reduce the area available for coating with a biological or chemical sample.

Furthermore, the reliability of such markings is low, since they can be removed or rendered unusable by mechanical damage to the surface, break-off of parts of the microscope slide, by wash-off in the case of imprinted markings, by the detachment of labels from the microscope slide in the case of markings on labels. This problem is particularly significant for samples to be examined by laboratory diagnostic means, since established analytical or diagnostic methods frequently envisage, in at least one step, the treatment of the sample with aggressive chemicals such as highly reactive acids, very strong solvents, for example xylene, or with concentrated dyes, which can cover or smudge markings.

Not least, such conventional markings complicate the workflows, since an immediate verification of the identity during processing, for example a microscopic examination, is not immediately possible. In fact, the microscope slide must first be removed from the microscope and be read with another instrument suitable for detecting the marking or with the human eye. In this case, mismatchings can occur in turn, for instance when the field viewed in the microscope is accidentally mixed up with another field or biochips containing samples from different patients are mixed up.

It is therefore an object of the present invention to provide a microscope slide containing a biological or chemical sample, which microscope slide is designed such that an impairment, destruction or defacing of the marking is prevented during the application of the biological or chemical sample or during subsequent steps, more particularly during the processing or analyzing of the sample, for example as a result of mechanical damage, as a result of smudging by or running of dyes or as a result of reaction with reactive chemicals.

It is a further object of the present invention to provide a microscope slide containing a biological or chemical sample, which microscope slide comprises an internally impressed marking, wherein the biological or chemical sample and the marking can be viewed using the microscope during an analytical or diagnostic examination, preferably during a microscopy step, without altering the preferably horizontal position of the microscope slide or the field of view containing the sample and/or without an additional instrument suitable for detecting the marking.

It is a further object of the present invention to provide a microscope slide containing marking, which microscope slide is designed such that the ratio of the area used by the sample to the total area of the microscope slide is optimized and the amount of the reagents and substrates required for the examination or reaction to be carried out is preferably minimized.

It is a further object of the present invention to provide a microscope slide containing a marking, which microscope slide allows a continuously the identity safeguard during the examination, preferably with optimization of the necessary work steps and, yet more preferably, minimization of the size of the microscope slide.

These objects and further objects are achieved by the subject matter of the present application and especially by the subject matter of the attached independent claims, with embodiments being revealed by the dependent claims.

In a first aspect, the object underlying the present invention is achieved by a transparent microscope slide which comprises a marking impressed internally, preferably under the intact surface of the microscope slide.

In a first embodiment of the first aspect, the microscope slide contains a biological or chemical sample.

In a first specific embodiment of the first embodiment, the biological or chemical sample and the marking are arranged such that, during an examination by means of a microscope, focusing can be carried out on either the marking or the biological or chemical sample without altering the position of the microscope slide under the microscope, wherein at least one portion of the marking, preferably the entire marking, is not visible when focusing is carried out on the biological or chemical sample.

In a second specific embodiment of the first embodiment, the biological or chemical sample and the marking are furthermore arranged such that at least one portion of the area occupied by the biological or chemical sample, preferably at least 50, 75, 90% thereof or the entire area, is not visible, preferably the entire sample, when focusing is carried out on the marking.

In a second embodiment, which is an embodiment of the first embodiment, the biological or chemical sample is processed, wherein the sample is preferably a biological sample which is processed diagnostically or analytically.

In a third embodiment, which is an embodiment of the first to second embodiment, the object is achieved by a holder comprising at least two transparent microscope slides containing a biological or chemical sample in each case, wherein the biological or chemical samples on at least two of the transparent microscope slides are preferably processed diagnostically or analytically according to different methods.

In a second aspect, the object is achieved by a diagnostic instrument, preferably a microscope, comprising the transparent microscope slide according to the invention or comprising the holder according to the invention comprising two or more transparent microscope slides.

In a third aspect, the object is achieved by a method comprising the steps of
a) providing a transparent microscope slide,
b) impressing a marking which is located inside the microscope slide,
c) supplying the transparent microscope slide with a biological or chemical sample and
d) optionally: dividing the transparent microscope slide after step c) to produce at least two transparent microscope slide fragments comprising material from the biological or chemical sample.

In a first embodiment of the third aspect, the transparent microscope slide is supplied with a multiplicity of markings which are arranged across the surface of the microscope slide at regular intervals and in a density such that the microscope slide fragments produced in step d) each comprise at least one marking.

In a second embodiment of the third aspect, which is also one embodiment of the first embodiment, the object is achieved by a method further comprising the step of
e) processing the sample on at least one microscope slide, the sample preferably being a biological sample which is processed diagnostically or analytically.

In a preferred embodiment of the microscope slide or method according to the invention, the marking and the biological or chemical sample are arranged on top of one another in one field of view. This is preferably the case when at least one portion of the area occupied by the marking on the microscope slide is, when viewing the microscope slide from above, on an axis which is perpendicular to the plane of the preferably planar microscope slide and which also intersects the area occupied by the biological or chemical sample; preferably, the portion comprises at least 25, 50, 75 or 90% of the area occupied by the marking on the microscope slide. In a preferred embodiment, the area of the smallest possible rectangle into which the marking exactly fits is considered to be the area occupied by the marking. If a microscope slide comprises multiple separate marking elements, each thereof is preferably considered to be a marking.

In a preferred embodiment of the microscope slide or method according to the invention, the marking is impressed by laser machining.

In a preferred embodiment of the microscope slide or method according to the invention, the biological or chemical sample is selected from the group comprising cells, tissue sections and biochemically characterized substances.

In a preferred embodiment of the microscope slide or method according to the invention, the transparent microscope slide consists of glass, a mineral substance or plastic, preferably of glass.

In a preferred embodiment of the microscope slide or method according to the invention, the marking is a barcode or dotcode, preferably a dotcode.

In a preferred embodiment of the microscope slide or method according to the invention, the biological or chemical sample and the marking are arranged in one field of view such that focusing can be carried out on either the marking or the biological or chemical sample without altering the position of the microscope slide under a microscope.

In a preferred embodiment of the microscope slide or method according to the invention, the transparent microscope slide consists of a homogeneous material.

In a preferred embodiment of the transparent microscope slide or method according to the invention, the marking contains microscopically small, visually legible numerals.

In a preferred embodiment of the method according to the invention, the method comprises step d) and each of the microscope slide fragments after step d) contains at least one marking which makes it possible to assign the particular microscope slide fragment to the transparent microscope slide in step a), preferably via a code as part of the marking, which code can be specifically assigned to the transparent microscope slide in step a).

In a preferred embodiment, the method according to the invention comprises step d) and the markings of all the microscope slide fragments comprise an identical code as part of the marking.

The present invention provides a transparent microscope slide containing a biological or chemical sample. The sample can be of any nature. For example, the sample can be a tissue section to be examined, which is applied to the transparent microscope slide and is then examined with a reagent in the form of fluorescently labeled antibodies against an antigen on the tissue section in an aqueous solution. Equally, the sample can be a liquid sample such as a blood sample, which is examined with an immobilized reagent applied to the microscope slide in the form of a coating.

The nature of the microscope slide is such that it is suited to accommodating a sample, especially a chemical or biological sample, for example by means of coating, and has an appropriate shape, for example having indentations, and/or chemical/physical properties, for example a surface capable of adsorption or chemical groups capable of reaction. Furthermore, the nature of said slide is such that it can be divided into fragments. In a preferred embodiment, the sample is attached to the surface of the microscope slide in the form of a coating or bonded thereto chemically by means of covalent or noncovalent bonds. Suitable microscope slides are described in the prior art, for example in DE 20 2011 005 278.

For example, the microscope slide can be a slide which is exclusively or predominantly, at least at the positions at which transparency is required in order to perceive the sample and the marking, of glass, clear plastic or the like. In a particularly preferred embodiment, the microscope slide is a commercially available microscope slide composed of transparent glass, as described in DE 20 2011 005 278 for example.

Possible materials include glass, transparent mineral materials and transparent plastics. Mixtures of various transparent materials compatible with one another are also possible. The thickness of the transparent microscope slide is preferably from 0.05 to 20 mm, more preferably from 0.1 to 1.5 mm, yet more preferably from 0.1 to 0.3 mm. The transparent microscope slide typically has dimensions which allow an analysis on the high-throughput scale in typical laboratory spaces. Preferably, the area of the microscope slide is from 1 $mm^2$ to 100 $cm^2$, most preferably from 4 $cm^2$ to 20 $cm^2$ In a preferred embodiment, the microscope slide is a commercially available coverslip composed of borosilicate glass having dimensions 76 mm×26 mm×0.15 mm.

The term "field of view", as used herein, is preferably to be understood to mean the part of the microscope slide which, comprising the biological or chemical sample, is open to the view of the viewer when said viewer is examining the microscope slide under a microscope.

With respect to its optical properties, the transparent microscope slide makes it possible for the marking to be perceived immediately or via a minor adjustment of the focus when viewing the biological or chemical sample microscopically. In a preferred embodiment, the marking can be read with the naked eye. In a preferred embodiment, the term "transparent", as used herein, means that the material of the microscope slide, though enclosing the marking, allows a visual or instrument-assisted detection of the marking, the type of instrument-assisted detection depending on the nature of the marking. Preferably, the transparency allows a light microscopy or fluorescence microscopy analysis of the sample on the microscope slide together with marking.

In a preferred embodiment, the microscope slide is transparent throughout; in a preferred embodiment, said slide is transparent at least at those positions at which it comprises on its surface the biological or chemical sample, making it possible to detect the internally incorporated marking. In a further more preferred embodiment, the microscope slide is nontransparent at the positions at which it comprises the sample, but transparent at the position of the marking. There is also the possibility of the microscope slide being nontransparent at positions at which it does not comprise any sample on its surface, in order to direct the attention of the viewer to the sample and the marking and/or to increase the contrast. At such positions, the microscope slide can consist of a nontransparent material, or be made nontransparent by lamination with a film or coating with a color, preferably with a dark shade, most preferably black. The sample is itself clear or thin enough not to appreciably impair the detectability and legibility of the marking with appropriate change in the focusing.

The transparent microscope slide can comprise one sample or more than one sample, and, in the latter case, the samples can come from differing material and/or from different sources. In a preferred embodiment, the sample is a tissue section, particularly preferably from a human or animal patient, which is applied to the microscope slide, followed by the microscope slide being cut up in a particularly preferred embodiment, yielding numerous smaller microscope slide fragments comprising sample material from the same patient. In the case of more than one sample, the samples can be present on the microscope slide separately or in a colocalized manner.

In a preferred embodiment, the term "sample", as used herein, is understood to mean a biological sample to be examined for its properties or a chemical substance or a substance mixture to be examined for its properties.

For example, the biological sample can be selected from the group comprising tissue, preferably tissue sections or tissue biopsies, for example cryosections or paraffin sections, biological cells such as eukaryotic or prokaryotic cells or products therefrom, viruses, purified, isolated or synthesized molecules such as nucleic acids, polypeptides, lipids or carbohydrates. Preferably, the biological sample is of human or animal origin. Preferably, the sample has a volume of at least 0.1 µl, more preferably 1 µl, even more preferably 10 µl, even more preferably 100 µl, even more preferably 1 ml. Preferably, the sample has a mass of at least 10 ng, more preferably 100 ng, more preferably 1 mg, even more preferably 10 mg.

For example, the chemical sample can be selected from the group comprising small molecules, biological macromolecules such as nucleic acids, polypeptides, lipids or carbohydrates, natural products, artificial polymers and inorganic substances. Preferably, the chemical sample is a nucleic acid which is particularly preferably immobilized.

Preferably, the transparent microscope slide according to the invention is intended for a diagnostic method, though it is also suitable for a multiplicity of nondiagnostic applications. For example, transparent microscope slides can be coated with substance libraries, which can be examined or screened in a high-throughput method for their biological or pharmacological activity or for particular physical properties, for example material properties such as fracture toughness. Chemical reactants can be examined for their reactivity in indentations on the surface of the microscope slide, for example analysis of the product or intermediate products by means of microscopy or monitoring of the reaction with suitable instruments.

The transparent microscope slide according to the invention is preferably planar from the base surface, but can comprise specific fields or indentations, for example those which, by means of elevations or indentations, allow a spatially limited covering with a liquid without possible uncontrolled distribution thereof. Such indentations can form small reactors in which chemical reactions and biological interactions can proceed independently of one another on the microscope slide in a suitable solvent, for example the binding of an antibody to an antigen. Numerous formats are described in the prior art, for example microtiter plates, incubation vessels having grooves (US20100124750), elevations (DE 10 2013 017 802) and the like.

The microscope slide according to the invention can additionally contain coatings for controlling the accumulation of liquids in specific areas. For example, hydrophobic surfaces cannot be wetted, whereas hydrophilic surfaces are easily wettable.

According to the invention, it is envisaged that a biological or chemical sample can be processed. In a preferred embodiment, the term "processed", as used herein, is understood to mean that the sample is no longer present in the state in which it was acquired and/or applied to the transparent microscope slide, was preferably acquired from the human or animal patient, but in a processed state. Typically, processing encompasses a physical treatment of the sample, for example by heating, staining, drying or the like, or a chemical treatment, for example immobilization by chemical bonds, reduction of the sample, addition of enzyme inhibitors or the like. Processing or preparation can also encompass a preservation, for example the protection of the sample from desiccation, for example by covering with a glycerol solution or with resin-type substances dissolved in organic solvent.

In a particularly preferred embodiment, the sample is processed diagnostically or analytically. In a preferred embodiment, the term "processed diagnostically or analytically", as used herein, is understood to mean that the sample has been treated with diagnostic methods and/or agents such that its state, optionally after further processing steps, allows an analysis and a contribution to a diagnosis. Possibilities are, for example, laboratory medical, cytological, morphological microscopic, biochemical, (immuno)chemical, especially immunohistochemical or enzyme histochemical, molecular biology, histological, serological, pathological, chemical or physical analytical methods. In a particularly preferred embodiment, the sample is a biological sample which has been fixed in formalin solution and/or paraffinized. In a particularly preferred embodiment, a tissue section is stained with dyes or labeled antibodies, preferably fluorescently labeled antibodies, and examined microscopically with respect to the morphology of the cells contained therein. Exemplary molecular biology methods encompass in situ hybridizations such as fluorescence in situ hybridization. Exemplary pathological methods encompass stainings such as ATPase, NADH, hematoxylin and eosin, Gomori trichrome, PAS, and oil red staining on muscle biopsies. Suitable reagents, software and instruments for processing samples are commercially available, for example from the company EUROIMMUN AG Medizinische Labordiagnostika, Lübeck.

With respect to the marking, it is essential according to the invention that said marking is situated inside the transparent microscope slide. This is preferably the case when no portion of the marking comes directly into contact with a liquid into which the microscope slide is immersed in the intact state. In a further preferred embodiment, the marking is situated predominantly or, preferably, completely below the surface of the microscope slide or within the three-dimensional space enclosed by the surfaces of the sides of the microscope slide. In a preferred embodiment, the term "impressing" covers all methods which lead to the production of a microscope slide having a marking inside. Preferably, the term "impressing" is to be understood broadly in this connection, in the sense that it encompasses incorporating the marking by means of all available suitable techniques and the terms "impressing" and "incorporating" are particularly preferably synonymous.

In a preferred embodiment, the marking is impressed into the transparent microscope slide by laser machining. The term "laser machining" encompasses all methods available to a person skilled in the art for impressing a marking into a transparent microscope slide by using a laser. Suitable methods for laser processing of transparent bodies are described in WO 2008/151616. In brief, this is accomplished by applying laser pulses having an appropriate beam profile, an appropriate laser wavelength, preferably from the range from 300 to 1000 nm, pulse length, preferably from the range from 250 to 1000 nm, even more preferably 300 to 1000 nm, pulse length, preferably from the range from fs to 20 ns, even more preferably 300 ps to 20 ns, and irradiance.

Preferably, the marking is microscopically small, i.e., it cannot be read, even more preferably cannot be detected at all, with the naked eye.

Alternatively, the marking can be introduced into the interior of the microscope slide by said marking, for example in the form of a solid, printed plastic strip or the like of small size, being introduced into a curable mixture of reactive monomers, which then hardens with encasing of the marking to give a transparent polymer, for example composed of polymethyl methacrylate, as microscope slide. Lastly, the marking can also be impressed by the microscope slide consisting of various, successively adhesively bonded layers, of which one or more than one of the inner layers has the marking on one surface. However, it is particularly preferred that the marking is impressed by laser machining inside a transparent microscope slide present in homogeneous form.

Particularly preferably, the marking is situated inside an otherwise homogeneous transparent microscope slide. In a preferred embodiment, the term "homogeneous", as used herein, is understood to mean that the transparent microscope slide according to the invention, apart from the marking, consists throughout of one block of the material without any internal boundaries and not, for instance, of various layers or pieces of the material or various materials that have been stuck together.

In the case of the marking, any marking which is located inside the transparent microscope slide, but is detectable and readable from the outside, is a possibility. In a preferred embodiment, the marking is an optically detectable and readable marking, even more preferably a machine-readable marking, most preferably a barcode, for example a one-, two- or three-dimensional barcode or dotcode, more particularly a dotcode. Alternatively, a sequence of letters and/or numerals can be used. Other types of marking and detection are conceivable too. For example, it is possible for the marking to be detectable via its absorption, for example within the UV/visible range, via fluorescence or radioactivity. The marking can also be created in the form of patterns, shapes or small, microscope slide-incorporated bodies or cavities having a characteristic shape, number, density, color and/or arrangement.

It is particularly preferred that the transparent microscope slide, especially in step a), comprises a multiplicity of logically arranged markings, for example in numerically and/or alphabetically sequential form, and so it is possible to assign on the basis of the markings, at which position of the transparent microscope slide each of the microscope slide fragments from step d) was situated before division. The marking can contain not only the location of the microscope slide fragment on the microscope slide, but also further information, for example in relation to the type of sample or, particularly preferably, in relation to the identity of the patient from whom the sample was obtained.

In the case of the diagnostic instrument according to the invention, the instrument can be any instrument or any combination of instruments that is/are suitable for examining the sample and/or the marking. This encompasses, for example, all variants of microscopy, more particularly light and fluorescence microscopy, furthermore devices for the spectroscopic examination of the samples, for example UV/visible spectrometer or fluorescence spectroscope, scintillation counter, cameras and combinations thereof. Preference is given to a microscope. Said microscope is equipped such that the microscope slide is positioned by a relative movement of the surface containing the sample in relation to the front lens of the microscope by raising and lowering of the stage or objective of the microscope.

When carrying out the method according to the invention, which is preferably geared toward the production of at least one microscope slide containing at least one sample and an internally impressed marking, a transparent microscope slide is provided in a step a). In a step b), a marking is impressed inside the transparent microscope slide. Furthermore, the microscope slide is supplied with a biological or chemical sample in a step c). In this connection, the sequence of steps b) and c) is not important. There is also the possibility of first supplying the microscope slide with the sample and then impressing the marking.

An at least partial processing of the microscope slide in step e) is possible too before the marking is applied. The various method steps can also be carried out at the same time or at least in an overlapping manner. Processing typically comprises treatment with chemical or diagnostic reagents. Suitable reagents encompass, for example, antibodies, dyes, oxidants or reductants, preservatives, protease inhibitors, antibiotics and the like. Before or after said treatment or between multiple treatment steps, it may be necessary to wash and/or to dry the microscope slide. If the chip is being used for a diagnostic method, a further step follows, involving the reading of the marking, preferably before the analysis of the sample, in order to allow assignment to a patient. Depending on the nature of the marking, it is necessary to use a method suitable therefor, optionally with use of an appropriate additional instrument. In the simplest case, reading is done purely visually, optionally with the aid of a microscope, preferably light microscope. In the case of a marking inserted by laser machining, it is also possible to use other techniques such as optical coherence tomography. Step e) can be followed by the analysis of the sample, which, in the case of a microscopic analysis, comprises focusing on sample and/or marking, optionally followed by the examination of the findings by expert personnel.

The invention will be elucidated below on the basis of exemplary embodiments with reference to the figures. The described embodiments are merely exemplary in every respect and should not be understood to be restrictive, and various combinations of the mentioned features are covered by the scope of the invention.

Figure 1:
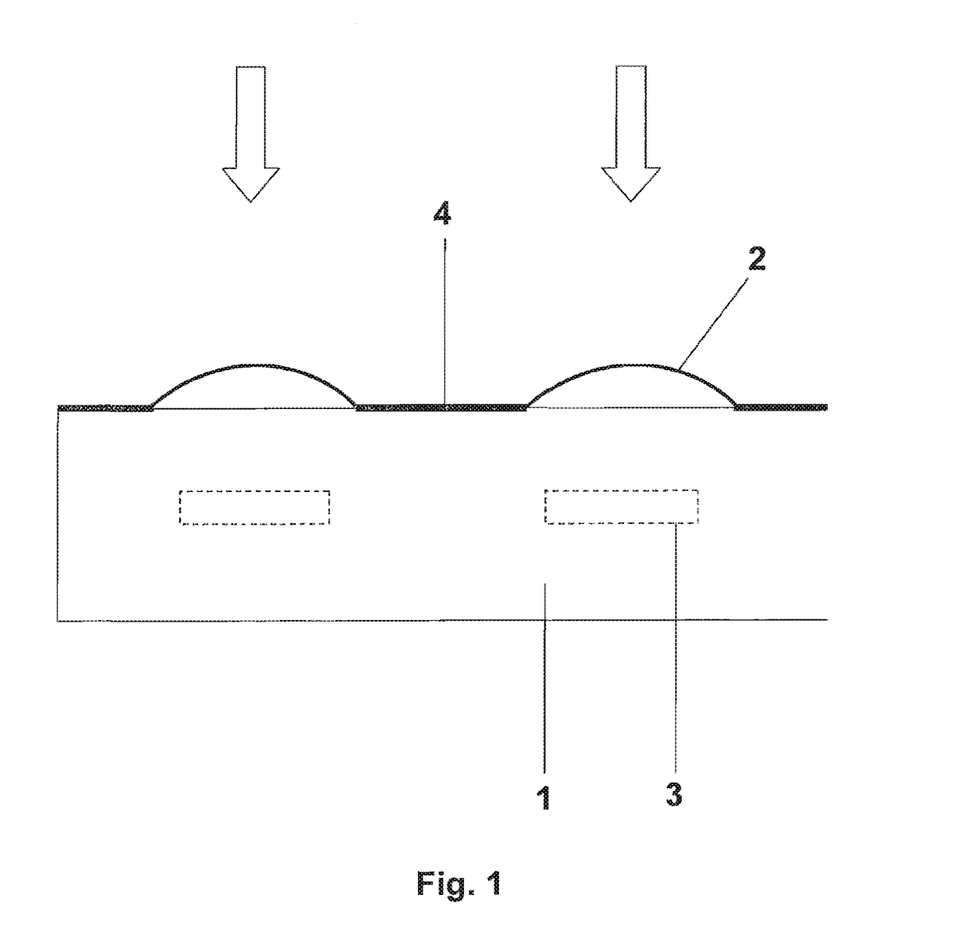

FIG. 1 shows a transparent microscope slide (1) according to the invention containing a biological or chemical sample (2), a marking inside (3) and—optionally—a hydrophobic coating (4) on portions of the surface of the transparent microscope slide that are not covered by the biological or chemical sample. The block arrows show the viewing direction of a viewer during the analysis of the sample on the microscope slide.

Figure 2A:
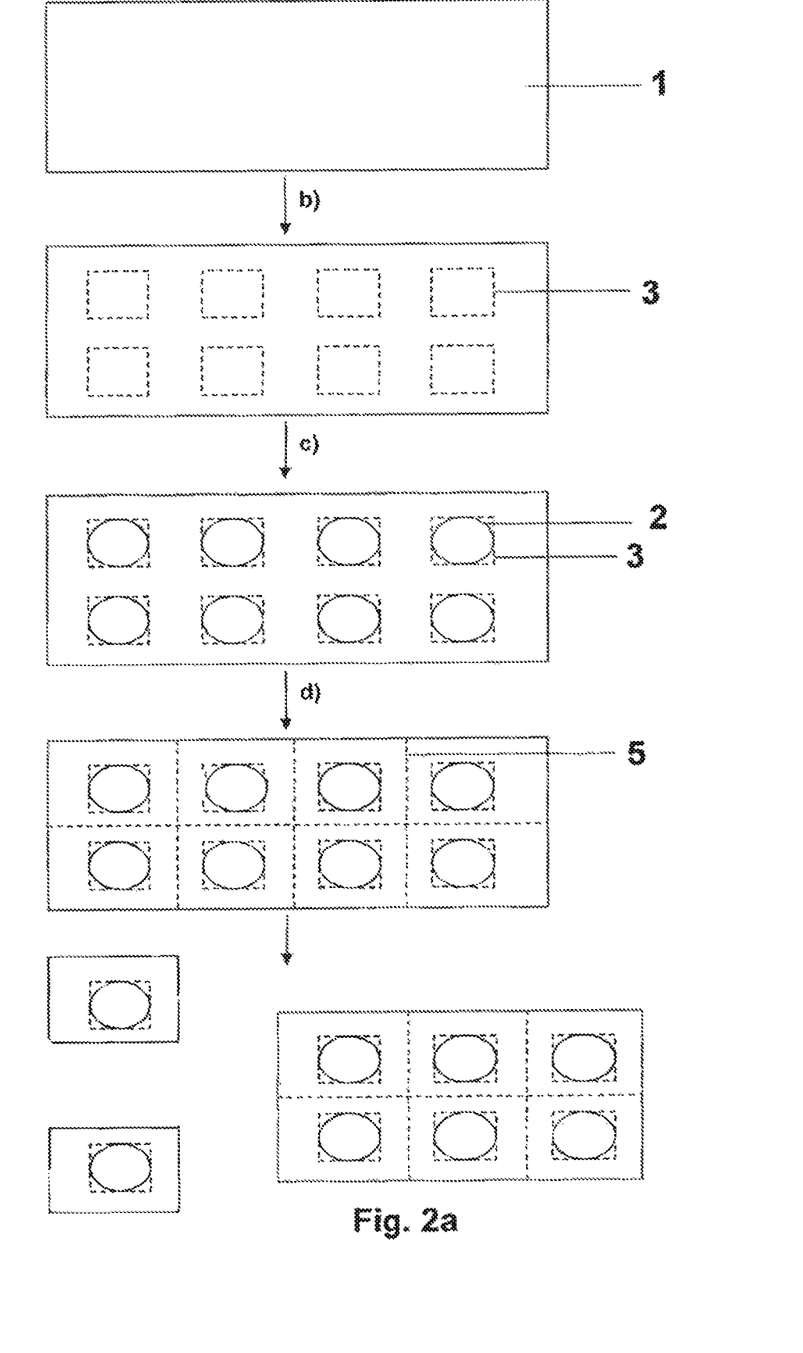

FIG. 2a shows an exemplary method according to the invention, in which a transparent microscope slide (1) is provided in a step a), then a marking is impressed inside the transparent microscope slide in a step b), is then supplied with a multiplicity of biological or chemical samples (2) in a step c) and is lastly cut to produce a cutting line (5) in a step d), producing two or more than two smaller transparent microscope slides, each comprising material from the chemical or biological sample (2).

Figure 2B:
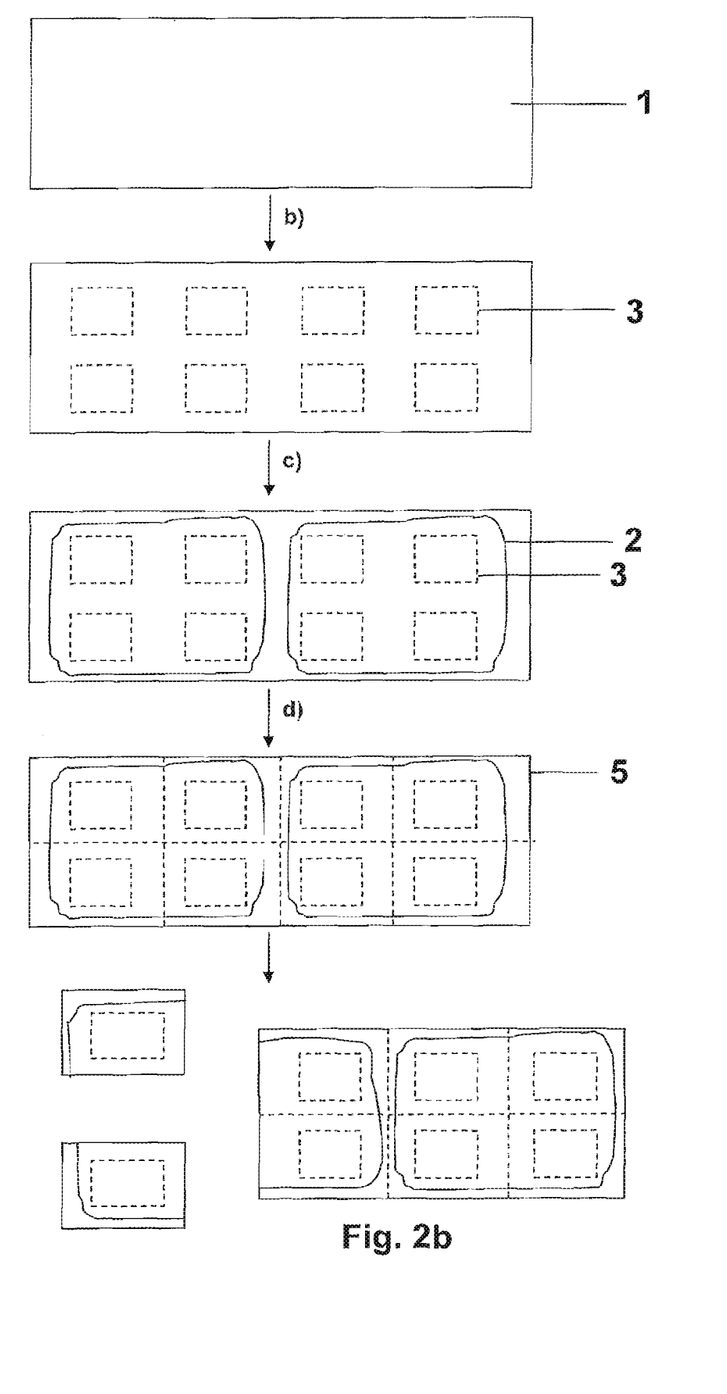

FIG. 2b shows a modification of the exemplary method according to the invention that is depicted in FIG. 2a. In this case, a multiplicity of samples is not applied in step c), but instead only a single sample, for example a tissue section covering an area containing multiple markings. As a result, the method yields smaller transparent microscope slides which all comprise a portion of the same chemical or biological sample.

Figure 3A:
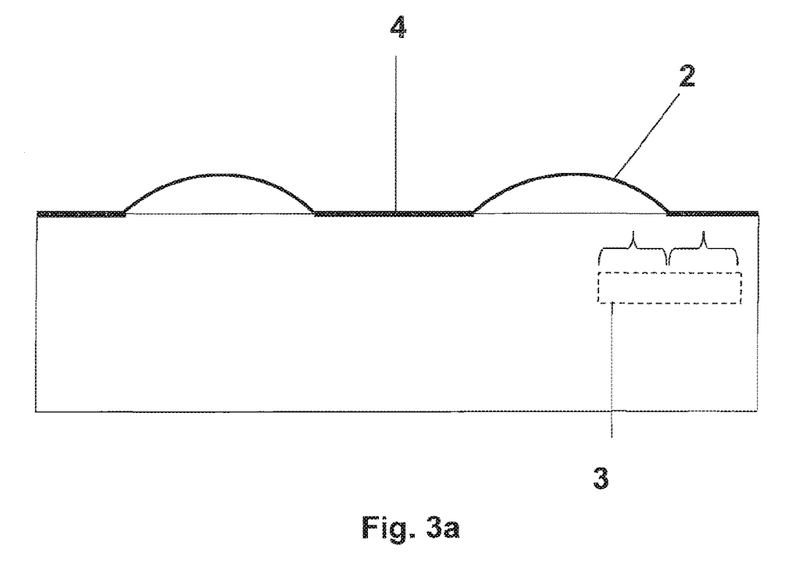
Figure 3B:
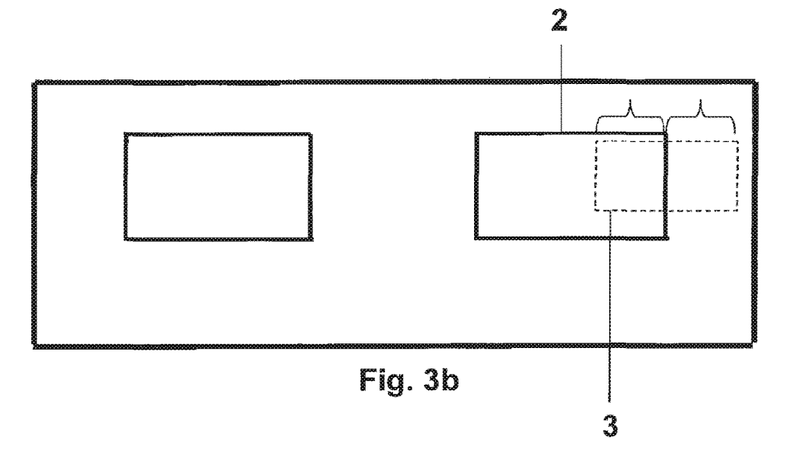

FIG. 3a (viewed from the side, in accordance with FIG. 1) and FIG. 3b (viewed from above) illustrate one sample (2) and one marking (3) inside, with at least one portion of the area of the marking, in this case the left half, and the sample being arranged on top of one another, more precisely 50% of the area of the marking. The two braces mark the two halves of the area occupied by the marking.

The invention claimed is:

1. A transparent microscope slide comprising an internally impressed marking and a biological or chemical sample,
wherein the biological or chemical sample and the marking are arranged such that during an examination by means of a microscope, focusing can be carried out on either the marking or the biological or chemical sample without altering a position of the microscope slide under the microscope,
wherein at least one portion of the marking is not visible when focusing is carried out on the biological or chemical sample, and
wherein the internally impressed marking is impressed internally between an intact upper surface and an intact lower surface of the slide.

2. The transparent microscope slide of claim 1, wherein the biological or chemical sample and the marking are arranged such that at least one portion of the area occupied by the biological or chemical sample is not visible when focusing is carried out on the marking.

3. The transparent microscope slide of claim 1, wherein the biological or chemical sample is processed, and wherein the sample is a biological sample which is processed diagnostically or analytically.

4. A holder comprising at least two transparent microscope slides of claim 1, wherein the samples on at least two of the transparent microscope slides are processed diagnostically or analytically according to different methods.

5. A diagnostic instrument, comprising the transparent microscope slide of claim 1, introduced into the instrument, or comprising a holder comprising at least two transparent microscope slides of claim 1.

6. The diagnostic instrument of claim 5, which is a microscope.

7. The transparent microscope slide of claim 1, wherein the marking and the biological or chemical sample are arranged on top of one another.

8. The transparent microscope slide of claim 1, wherein at least one portion of the area occupied by the marking on the microscope slide is, when viewing the microscope slide from above, on an axis which is perpendicular to the plane of the microscope slide and which also intersects the area occupied by the biological or chemical sample.

9. The transparent microscope slide of claim 1, wherein the marking is impressed by laser machining.

10. The transparent microscope slide of claim 1, wherein the transparent microscope slide consists of a homogeneous material.

11. The transparent microscope slide of claim 1, wherein the marking contains microscopically small, visually legible numerals.

12. The transparent microscope slide of claim 1, wherein the entire marking is not visible when focusing is carried out on the biological or chemical sample.

13. The transparent microscope slide of claim 1, wherein an entire area of the biological or chemical sample is not visible when focusing is carried out on the marking.

14. The transparent microscope slide of claim 1, wherein the transparent microscope slide does not comprise successive layers.

15. The transparent microscope slide of claim 1, wherein the transparent microscope slide consists throughout of one block of a material without any internal boundaries except for the internally impressed marking.

16. A method comprising:
   a) providing the transparent microscope slide as in claim 1,
   b) impressing a marking which is located inside the microscope slide,
   c) supplying the transparent microscope slide with a biological or chemical sample, and
   d) optionally, cutting the transparent microscope slide after c) to produce at least two smaller transparent microscope slides comprising a material from the biological or chemical sample.

17. The method of claim 16 comprising d), wherein the transparent microscope slide is supplied with a plurality of markings which are arranged across the surface of the microscope slide at regular intervals and in a density such that the smaller transparent microscope slides produced in d) each comprises at least one marking.

18. The method of claim 17, further comprising:
   e) processing the sample on at least one transparent microscope slide, wherein the sample is a biological sample which is processed diagnostically or analytically.

19. The method of claim 16, comprising d), and
   wherein each of the microscope slide fragments after d) contains at least one marking which makes it possible to assign a particular microscope slide fragment to the transparent microscope slide in a), via a code as a part of the marking, wherein the code is specifically assigned to the transparent microscope slide in a).

20. The method of claim 16, comprising d) and the markings of all microscope slide fragments comprise an identical code as a part of the marking.

* * * * *